RASTER DISTORTION CORRECTION TRANSFORMER

Filed Feb. 14, 1966

INVENTORS:
JOHN W. LISTER,
LAWRENCE E. SMITH,

BY Julius J. Zaskalicky
THEIR ATTORNEY.

INVENTORS:
JOHN W. LISTER,
LAWRENCE E. SMITH,

BY Julius J. Zaskalicky
THEIR ATTORNEY.

INVENTORS:
JOHN W. LISTER,
LAWRENCE E. SMITH,
BY [signature]
THEIR ATTORNEY.

United States Patent Office 3,440,482

Patented Apr. 22, 1969

3,440,482

RASTER DISTORTION CORRECTION TRANSFORMER

John W. Lister, Syracuse, and Lawrence E. Smith, North Syracuse, N.Y., assignors to General Electric Company, a corporation of New York Filed Feb. 14, 1966, Ser. No. 528,017
Int. Cl. H01j 29/72
U.S. Cl. 315—24 12 Claims

ABSTRACT OF THE DISCLOSURE

A raster distortion correction transformer including a primary and a pair of secondary windings to provide a properly proportioned component of current at horizontal frequency in the vertical deflection circuit to correct either "pin cushioning" or "barreling" effects in the vertical deflection of a color TV receiver. A primary winding encircles a pair of secondary windings each of which has a separately adjustable variable reluctance core. The secondary windings are connected in series opposing relationship with respect to the voltage induced therein by current flow in the primary winding. A bias magnet is also included within the primary winding.

The present invention relates in general to electromagnetic electron beam deflection systems and in particular to such systems for vertically deflecting the electron beam of a picture tube for a television receiver.

In a television receiver the electron beam of the picture tube is caused to scan the screen of the tube horizontally at a rapid rate and vertically at a slow rate to produce a raster of horizontal lines. The distance the electron beam has to travel to reach the screen of the picture tube is at a minimum at the center of the screen, is greater at the edges of the screen and is a maximum at the corners of the screen. Also, the deviation of the electron beam in the horizontal and vertical directions does not vary linearly with deflection currents supplied to the horizontal and vertical deflection coils. The existance of such conditions in the deflection system of the picture tube produces a result in which the horizontal scan lines displaced from the center of the raster bow inward at the center thereof. Such bowing is greater for lines spaced at a greater distance from the center of the raster. Also, corresponding points on the horizontal scan lines bow toward the center of the raster. Such a result in the raster of the picture tube is known as "pin cushion" effect. When the horizontal lines bow outward from the center of the raster instead of bowing inward, the condition is referred to as vertical "barreling." Also when the vertical lines connecting corresponding points on the horizontal scan lines bow outward instead of bowing inward the condition is known as horizontal "barreling." Such vertical distortion effects as described above have been corrected in the prior art in monochrome systems by appropriate placement of permanent magnets about the yoke of the picture tube. In color television systems such a simple provision leads to impairment of color purity and accordingly other provisions must be made. In color television systems the vertical distortion effects mentioned above are corrected by the superposition of currents in the vertical deflection circuit of horizontal deflection periodicity and of proper phase and amplitude to straighten each of the horizontal scan lines of the electron beam to the extent necessary. Such correction currents have been produced and introduced into the vertical deflection circuit by devices and associated circuits which have left something to be desired with regard to simplicity, size, cost, efficiency and reliability.

The present invention is directed to providing simple, compact, inexpensive, efficient, and highly reliable means for accomplishing vertical "pin cushioning" or "barreling" correction in electromagnetic deflection systems.

In accordance with an allustrative embodiment of the present invention a vertical deflection circuit and a transformer included therein is provided which superimposes on the normal vertical deflection current, a current of horizontal deflection frequency which modifies the deflection of the electron beam in the vertical direction to eliminate vertical pin cushioning. Such superimposed current has maximum amplitude at the peak values of the vertical deflection current and zero amplitude at the point in time at which the vertical deflection current is zero. The amplitude of the envelope of such superimposed current decreases approximately linearly from one peak amplitude of vertical deflection current to zero and then increases approximately linearly to the other peak amplitude of vertical deflection current. The current waves are sinusoidal and are phased so that alternate peaks occur at instants corresponding to zero horizontal deflection current and further phased so that the current of such peaks add to the vertical deflection current regardless of the direction of current flow through the deflection coils.

The circuit for developing and for introducing such current into the vertical deflection circuit comprises a parallel resonant circuit consisting of an inductance and a capacitance connected in circuit with the deflection coils and tuned to the horizontal deflection frequency of the system. Essentially pulses of voltage of horizontal deflection repetition rate are applied in series relationship to the inductance and capacitance of the resonant circuit. The amplitude of the pulses progressively decreases from a peak to a zero value at a point in time corresponding to zero vertical deflection current and thereafter increases in opposite phase to the other peak. Such a voltage wave applied in series to the resonant circuit produces an oscillatory current of horizontal repetition rate which combines with the normal deflection current in proper phase to produce the desired result.

The transformer for developing such voltage pulses comprises a primary winding and a pair of secondary windings, each of said secondary windings being coupled to said primary winding through a respective magnetic circuit. Each magnetic circuit includes a core of magnetic material, the permeability of which decreases with increasing flux density in the core over a range of flux densities whereby the reluctance of each of said circuits varies in direct relationship with respect to the net flux density therein. Means are provided for producing a flux density in the cores lying in the aforementioned range. The secondary windings are connected in series opposing relationship with respect to the voltage induced therein by current flow in the primary winding. Such windings are also connected in series with the aforementioned capacitance and inductance. The primary winding is connected to the source of horizontal deflection current.

The novel features believed characteristic of the present invention are set forth in the appended claims. The invention itself, together with further objects and advantages thereof, may best be understood by the following description taken in connection with the accompanying drawings in which:

FIGURE 5A is a graph of uncorrected vertical deflection current.

FIGURE 5B is a graph of the horizontal deflection current.

FIGURE 5C is a graph of the induced voltage pulses appearing across one of the secondary windings of the transformer of FIGURE 3A resulting from horizontal deflection current flowing through the primary winding thereof.

FIGURE 5D is a graph of the induced voltage pulses appearing across the other secondary winding of the transformer of FIGURE 3A.

FIGURE 5E represents the combination of the voltages appearing across the secondary windings of the transformer of FIGURE 3A.

FIGURE 5F is a graph of current produced by the application of the voltage of FIGURE 5E to the resonant circuit of FIGURE 2.

FIGURE 5G is a graph of the composite vertical deflection current flowing through the vertical deflection coils, which is the sum of the currents of FIGURES 5A and 5F.

Figure 1A:
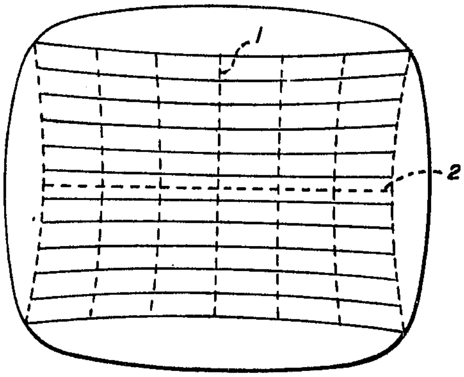
FIGURE 1A is a digram of a simplified raster of the picture tube of a television receiver which has "pin cushion" distortion along both the vertical and horizontal coordinates of the raster.

Referring now to FIGURE 1A there is shown a raster traced on the screen of a picture tube by the cathode ray beam thereof. Only twelve horizontal lines in a field of scan have been shown to simplify the explanation of the operation of the invention. The horizontally extending lines represent the horizontal trace of the electron beam. The dashed vertical lines represent the locus of the electron beam at corresponding time intervals on each of the lines. The condition depicted with the downward bowing of the horizontal lines in the upper half of the figure, and the upward bowing of the horizontal lines in the lower half of the figure is referred to as vertical "pin cushion" distortion. Similarly, the condition of the vertical dashed lines bowing inward at the centers is referred to as horizontal "pin cushion" distortion. Such distortions may be caused by a number of factors, as mentioned above.

Figure 1B:
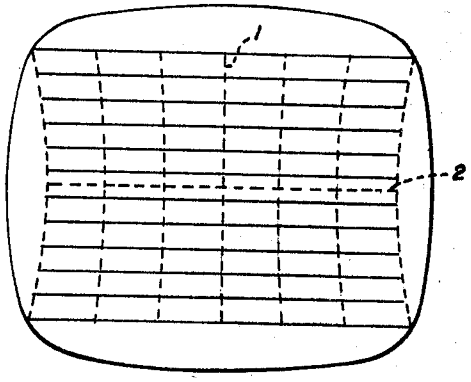
FIGURE 1B is a diagram showing the result of the correction of the raster of FIGURE 1A by means of the circuit in accordance with the present invention.

Referring now to FIGURE 1B there is shown the raster of FIGURE 1A in which correction has been applied to the conventional vertical deflection current to produce horizontal scan lines which are essentially straight. The result illustrated in FIGURE 1B may be accomplished by introducing a component of current of horizontal frequency which progressively increases as the electron beam scans a line from left to right, reaches a maximum at the center line 1 of FIGURE 1A, and then decreases to its initial value at the terminal end of the line of scan. It has been found that for accurate correction such current should increase hyperbolically to a maximum at the point of scan at which deviation is maximum, and thereafter decrease hyperbolically to its initial value. While a hyperbolic relationship is desired, a sinusoidal variation of current produces a good approximation thereto and produces a line of scan which is essentially straight. Another requirement of such correction current is that the amplitude of maximum correction at the center of horizontal scan, corresponding to zero horizontal deflection current, decrease from a maximum value at the upper or lower edge to a zero value at the center along the line 2 of FIGURE 1A. A further requirement is that as the beam passes from the upper half of the screen to the lower half that the phase of the correction current be reversed.

Figure 2:
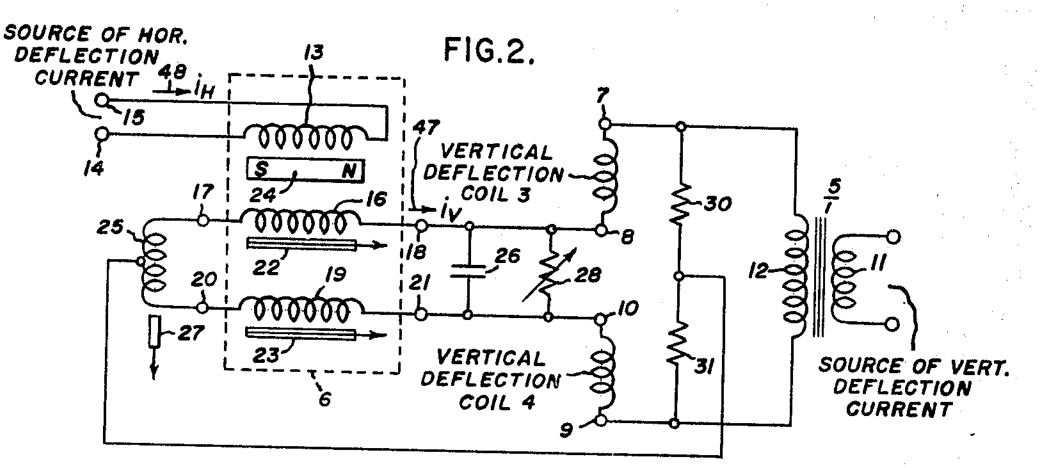
FIGURE 2 is a schematic diagram of the vertical deflection system for a television receiver in accordance with the present invention.

The result, such as illustrated in FIGURE 1B, is accomplished in accordance with the present invention by the deflection system shown in FIGURE 2. The circuit of FIGURE 2 includes a pair of deflection coils 3 and 4, a transformer 5 for supplying vertical deflection current to the coils, another transformer 6 connected for operation in conjunction with other circuit elements for modifying the vertical deflection current in the manner indicated in connection with the description of FIGURE 1B to provide the desired vertical deflection for each horizontal line of deflection of the electron beam. Vertical deflection coil 3 has terminals 7 and 8. Vertical deflection coil 4 has terminals 9 and 10. The transformer 5 has a primary winding 11 which is connected to a source of vertical deflection current and a secondary winding 12.

The transformer 6 has a primary winding 13 one end of which is connected to terminal 14 and the other is connected to terminal 15, a secondary winding 16 having terminals 17 and 18, and a secondary winding 19 having terminals 20 and 21. The secondary winding 16 has a core 22 of magnetic material therein. Similarly, secondary winding 19 has a core 23 of magnetic material therein. The transformer 6 also includes a permanent magnet 24 disposed with respect to the magnetic core members 22 and 23 of the secondary windings so as to provide magnetic induction therein. The magnetic material used in the core members 22 and 23 has the property that over a range of magnetic induction the permeability thereof decreases with increasing magnetic induction. The magnetic field strength of the permanent magnet and the reluctance of the magnetic paths through the cores of the secondary winding are adjusted so that the permeability of the core material under magnetization from the magnet is in the range mentioned above. The operation of the transformer will be further described in connection with FIGURES 4A, 4B and 4C.

Terminal 7 of the vertical deflection coil 3 is connected to one end of the secondary winding 12 and the terminal 9 of the deflection coil 4 is connected to the other end of the secondary winding 12. Terminal 8 of the vertical deflection coil 3 is connected to terminal 18 of the secondary winding 16. Terminal 10 of the deflection coil 4 is connected to terminal 21 of secondary winding 19. An inductor 25 is connected between terminals 17 and 20 of secondary windings 16 and 19. A capacitor 26 is connected across terminals 18 and 21 of secondary windings 16 and 19. The resonant circuit consisting of capacitor 26, secondary windings 16 and 19 and inductor 25 is tuned by means of magnetic slug member 27 in inductor 25 to the horizontal deflection frequency of the system. The variable resistor 28 is connected between terminals 8 and 10 of the vertical deflection coils to provide a control over the amplitude of the correctional currents of the horizontal frequency developed by the circuit. Resistances 30 and 31 which may be of identical values are connected in series across the secondary 12 of transformer 5 to provide damping of any horizontal components of deflection coupled into the vertical windings 3 and 4 from the horizontal deflection windings (not shown). The junction of resistances 30 and 31 is connected to an intermediate point or center tap on inductor 25. Such an arrangement is more efficient in utilization of correctional current in preferance to an arrangement in which a damping resistance is connected directly across each of the deflection coils. The primary 13 of the transformer 6 is connected to a current source of horizontal deflection frequency, for example, the horizontal deflection transformer.

Figure 3A:
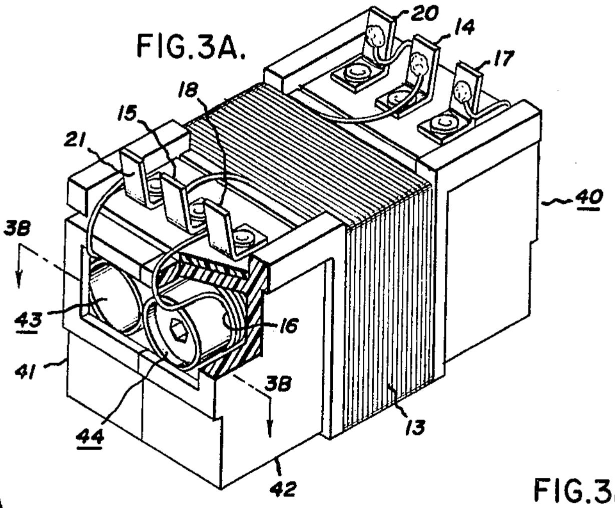
FIGURE 3A is a perspective view, partially in section, of the transformer in accordance with the present invention used in the system of FIGURE 2.
Figure 3B:
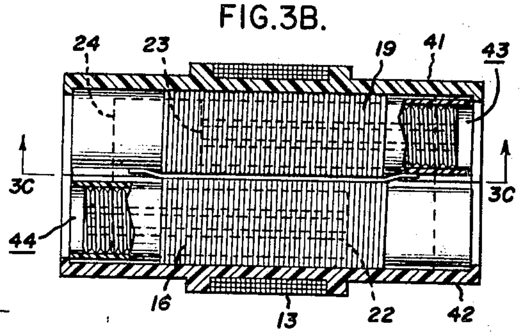
FIGURE 3B is a sectional view of FIGURE 3A taken along section 3B—3B showing certain constructional features of the transformer.
Figure 3C:
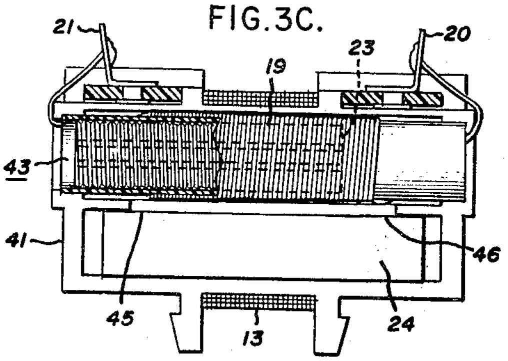
FIGURE 3C is another sectional view of the transformer of FIGURE 3A taken along section 3C—3C of FIGURE 3B showing further constructional features of the transformer.

Referring now to FIGURES 3A, 3B and 3C there is shown a physical form of the transformer 6 incorporated in the circuit of FIGURE 2. The same numerals as used in FIGURE 2 are used in FIGURES 3A, 3B and 3C to identify corresponding parts. The transformer comprises a bobbin 40 formed of a nonmagnetic insulating material. The bobbin 40 may be formed of a left half 41 and a right half 42 such that a hollow interior is provided for inclusion of the secondary winding assemblies 43 and 44 and the permanent magnet 24. Around the center portion of the bobbin 40 is included a wide groove in which primary winding 13 is wound between terminals 14 and 15. At each end at the top of the bobbin 40 are included a pair of terminal boards including the primary and secondary terminals 14, 15, 17, 18, 20 and 21. The secondary winding assembly 43 includes a hollow cylindrical form of nonmagnetic insulating material about which is wound the secondary winding 19 of the transformer in the same sense as the primary winding 13. One end of the secondary winding 19 is connected to terminal 20 and the other end is connected to terminal 21. A core member 23 or slug formed of a magnetic material such as Type M ferrite made by Fair-Rite Corporation of Wallkill, N.Y., is positioned in the interior of cylindrical form. Such material has a characteristic that the permeability thereof decreases as magnetic induction increases over a range thereof as will be more fully described in connection with FIGURE 4A. Similarly the secondary winding assembly 44 includes a cylindrical form of nonmagnetic insulating material about which secondary winding 16 is wound in the same sense as the secondary winding 19 and including the same number of turns. One end of the winding is connected to terminal 17 and the other end is connected to terminal 18. The assembly 44 also includes a slug member 22 constituted of a magnetic material such as the aforementioned Type M ferrite. Permanent magnet member 24 made of the material, such as Ceramagnet A made by Stackpole Carbon Company of St. Marys, Pa., in the geometric form of a parallelopiped type is included within the bobbin. The permanent magnet member 24 has a north pole located in one end 45 of the surface adjacent the secondary windings and a south pole located in the same surface at the other end 46 thereof. The axes of the secondary windings 16 and 19 are aligned in the direction of the axis of the primary winding 13 and also in the direction of the length dimension of permanent magnet member 24 so that a pair of magnetic circuits are formed which include the core members 22 and 23 of the secondary winding assemblies and the permanent magnet 24. The core or slug members 22 and 23 of secondary winding assemblies 16 and 19 are screwed into the coil form member so that they may be axially adjustable. The axial position of the core members determines the reluctance of the magnetic circuit through the respective secondary windings and thus is used to provide the desired amount of magnetic induction therein as will be more fully explained in connection with FIGURES 4A, 4B and 4C.

Figure 4A:
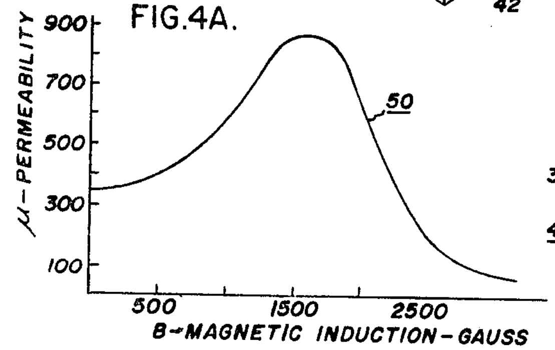
FIGURE 4A is a graph of permeability versus magnetic induction for the materials of which the core of the secondary windings of the transformer of FIGURE 3A is formed.

Referring now to FIGURE 4A there is shown a graph 50 of permeability as a function of magnetic induction for the material of the core members 22 and 23 included within the secondary winding assemblies 44 and 43. One such material is Type M ferrite of Fair-Rite Corporation mentioned above. This material has the property that at high values of magnetic induction, for example, magnetic induction in the range of 1600 to 2500 gauss, the permeability of the core decreases with increasing magnetic induction.

Figure 4B:
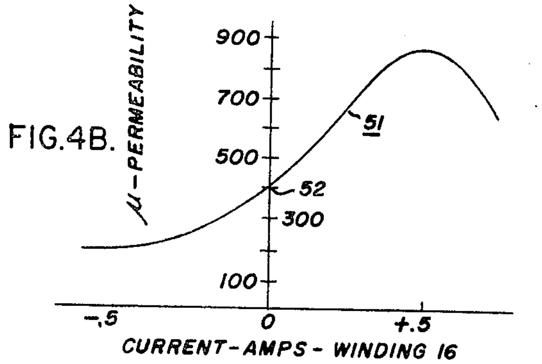
FIGURE 4B is a graph of permeability versus vertical deflection current through one of the secondary windings of the transformer of FIGURE 3A.

Referring now to FIGURE 4B there is shown a graph 51 of permeability versus vertical deflection current for the secondary winding 16 in which the reluctance of the magnetic circuit of the secondary winding assembly is adjusted so that the permeability of the magnetic core material for zero vertical current is at an intermediate level 52 on the slope of the graph.

Figure 4C:
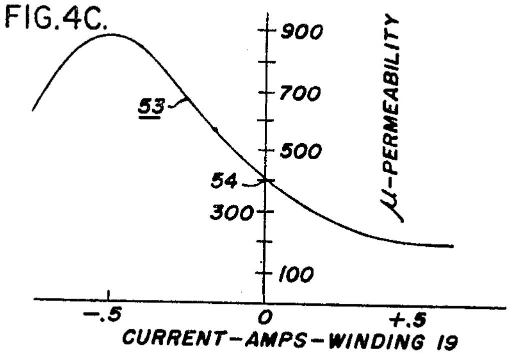
FIGURE 4C is a graph of permeability versus vertical deflection current through the other of the secondary windings of the transformer of FIGURE 3A.

Referring now to FIGURE 4C there is shown a graph 53 of the permeability of the core material of secondary winding 19 as a function of vertical deflection current flow therethrough. The reluctance of the magnetic path through the secondary winding is adjusted so that the permeability of the core material for zero vertical deflection current flow therethrough is at an intermediate level 54 on the slope of the graph. The values of permeability 52 and 54 for core members 22 and 23 are adjusted to be the same. In the circuit of FIGURE 2 the transformer secondary windings are interconnected in relationship to the vertical deflection flow such that current flows in one direction from terminal 21 to terminal 20 to terminal 17 to terminal 18, and in the other direction in just the reverse order. Accordingly, if such direction of current flow as indicated by arrow 47 is taken as positive, then decreasing negative current flow through the winding 16 has the effect of increasing the permeability in core 22 and decreasing negative current flow through winding 19 has the effect of decreasing the permeability in core 23. Accordingly, a voltage applied across the primary winding will induce a voltage in the secondary winding 16 which is increasing and a voltage in secondary winding 19 which is decreasing. The direction of positive current flow in the primary winding 13 is indicated by arrow 48.

The operation of circuit of FIGURE 2 will now be explained in conjunction with the diagrams of FIGURES 5A through 5G. In these figures the abscissa represents time and the ordinate represents either current or voltage, as indicated. It will be appreciated that each interval of vertical deflection includes many more intervals of horizontal deflection than shown in these figures, and time of horizontal retrace is much shorter in relation to forward trace than shown; however, in order to simplify the explanation of the circuit it is convenient to use a much smaller number of intervals and alter the waveforms along the time axis as indicated. Also, the amplitude of the various waveforms are not to scale, but are of amplitudes convenient for illustration and explanation.

Figure 5A:
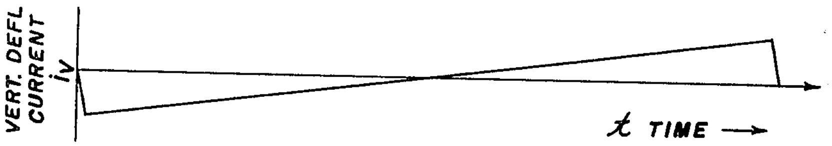
FIGURES 5A through 5G represent graphs of currents and voltages in various parts of the circuit of FIGURE 2, useful in explaining the operation of the present invention, as follows.

FIGURE 5A shows a single cycle of the vertical sawtooth wave of current such as would be developed in the secondary circuit of the transformer 5 and would represent the flow of current through the deflection coils 3 and 4 in the absence of any other current modifying circuits associated with such coils.

Figure 5B:
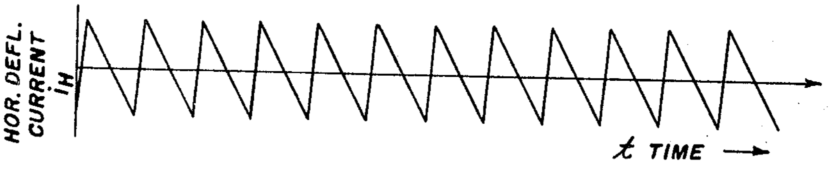

FIGURE 5B represents a total of twelve cycles of horizontal deflection current corresponding to the twelve lines of horizontal deflection represented in FIGURES 1A and 1B. A current of such form is applied to the primary winding 13 of transformer 6.

Figures 5C, 5D, 5E, 5F, 5G:
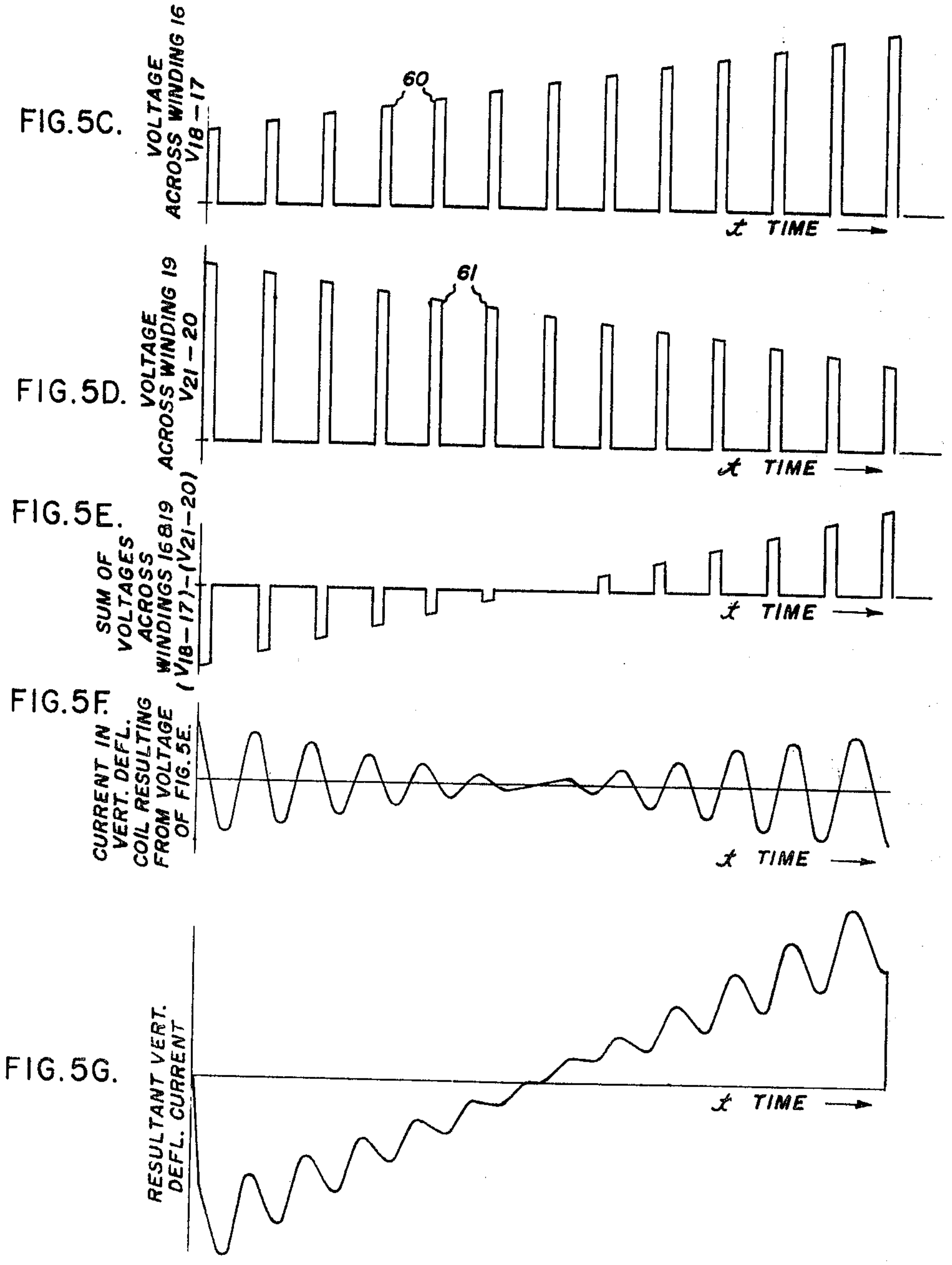

FIGURE 5C represents the pulses of voltage 60 developed across secondary winding 16 as a result of application of the horizontal deflection current of FIGURE 5B to primary winding 13. As explained in connection with FIGURE 4B such pulses of voltage increase in amplitude with deflection current through winding 16 for the reasons indicated namely, that the vertical deflection current flow through coil 16 decreases magnetic induction, and accordingly increases the voltage induced therein. As the same current flows through the other secondary winding 19 in the opposite direction it increases the magnetic induction in the winding 19 and accordingly decreases the permeability thereof. Thus, the pulses of voltage 61 developed across winding 19 decrease with increasing vertical deflection current, as shown in FIGURE 5D, and as explained in connection with FIGURE 4C.

FIGURE 5E represents the sum of the voltages developed across the secondary windings 16 and 19 and applied in series opposing relationship to the tuned circuit consisting of inductor 25 and capacitor 26 and the secondary windings. As such resonant circuit is tuned to the horizontal deflection frequency the pulses of voltage applied thereto develop corresponding waves of current of horizontal deflection periodicity as shown in FIGURE 5F. At one extreme of vertical deflection the pulse of voltage applied to the resonant circuit is large and correspondingly a large sinusoidal wave of current is produced as shown, and progressively as the pulses of voltage decrease the sine waves of current decrease linearly until at the point of the scan of a horizontal line corresponding to zero vertical deflection current the voltage and current are zero. As the vertical deflection current increases in value in the opposite direction pulses of voltage of opposite polarity and of increasing amplitude are now applied to the resonant circuit. Such pulses of voltage produce waves of current which are of the opposite phase and which linearily increase to a maximum value at the other extreme of vertical deflection.

As the amount of vertical current correction necessary varies from picture tube to picture tube, a need exists for a control on the amplitude correctional currents to produce the proper amount of distortion correction. The amplitude of the current waves of FIGURE 5F may be varied by varying the resistance of 28 of FIGURE 2. As the resistance is decreased, the amplitude of the current is decreased and conversely as the resistance is increased, the amplitude of the current increases.

Horizontal deflection currents induced into the vertical deflection coils from the horizontal deflection coils may excite the resonant circuit essentially comprising inductance 25 and capacitance 26 so as to produce current waves of fixed amplitude of one or the opposite phase over the entire period of vertical scan. Such a train of current waves would decrease the amplitude on one side of the center point of the train of waves of FIGURE 5F and increase the amplitude on the other side of the center point thereof. The resultant train of waves now has a minimum or center point which is shifted to one side or the other of the desired center point. Such effects are compensated for by adjusting the reluctance of the magnetic circuits associated with secondary windings 16 and 19 by means of core members 22 and 23. By appropriately varying the reluctance of the circuits the time of occurrence of the minimum point in the envelope may be shifted in time to occur sooner or later than the center point of the vertical deflection current wave. Such means may also be used to compensate cathode ray picture tubes in which the point of zero vertical deflection current does not necessarily correspond with the center of the raster.

The tuning of the resonant circuit essentially comprising inductance 25 and capacitance 26 may be varied to produce symmetry of correction about the vertical center line 1. Such variation in the tuning is simplified by tuning slug 27. By varying the inductance 25 the resonant frequency of the parrallel resonant circuit may be altered above and below the horizontal deflection frequency of the system to produce symmetry of correction.

From the foregoing explanation of the operation of the invention, it will be appreciated that to correct for vertical "barrelling" the direction of horizontal deflection currents applied to primary winding 13 would be reversed.

While the invention has been described in specific embodiments it will be appreciated that many modifications may be made by those skilled in the art, and we intend by the appended claims to cover all such modifications and changes as fall within the true spirit and scope of the invention.

What we claim as new and desire to secure by Letters Patent of the United States is:

1. A transformer comprising a primary winding, a pair of secondary windings, each of said secondary windings coupled to said primary winding through a respective magnetic circuit, the reluctance of each of said magnetic circuits varying in a direct relationship with respect to the net flux density therein, means for connecting said secondary windings in series opposing relationship with respect to the voltage induced therein by current flow in said primary winding, independent core means for each of said secondary windings for separately adjusting the reluctance of each of said circuits such that in the absence tionship with respect to the voltage induced therein by ondary windings is zero.

2. A transformer comprising a primary winding, a pair of secondary windings, each of said secondary windings coupled to said primary winding through a respective magnetic circuit, the reluctance of each of said magnetic circuits varying in a direct relationship with respect to the net magnetic flux density therein, means for connecting said secondary windings in series opposing relationship with respect to the voltage induced therein by current flow in said primary winding, independent core means for each of said secondary windings for separately adjusting the reluctance of each of said circuits such that in the absence of current flow in said secondary windings the net voltage across said secondary windings is zero, whereby a predetermined current flow in one direction through said windings produces a net voltage of one phase and a flow of a predetermined current through said windings in the opposite direction produces a net voltage of the opposite phase, said predetermined currents in said one and said opposite direction of the same amplitudes producing net voltages of the same amplitude, the net voltage across said secondary windings of one and the opposite phase varying symmetrically for a corresponding current flow therethrough.

3. A transformer comprising a primary winding, a pair of secondary windings, each of said secondary windings coupled to said primary winding through a respective magnetic circuit, each magnetic circuit including a core of magnetic material the permeability of which decreases with increasing flux density in the core over a range of flux densities whereby the reluctance of each of said circuits varies in a direct relationship with respect to the net flux density therein, means for providing magnetic induction to said cores to provide flux density therein lying in said range, means for connecting said secondary windings in series opposing relationship with respect to voltage developed across the windings by current flow in said primary winding, means for adjusting the reluctance of each of said circuits such that in the absence of current flow in said secondary windings the net voltage across said secondary windings is zero.

4. A transformer comprising a primary winding, a pair of secondary windings, each of said secondary windings coupled to said primary winding through a respective magnetic circuit, each magnetic circuit including a core of magnetic material the permeability of which decreases with increasing flux density in the core over a range of flux densities whereby the reluctance of each of said circuits varies in a direct relationship with respect to the net flux density therein, means for providing magnetic induction to said cores to provide flux density therein lying in said range, means for connecting said secondary windings in series opposing relationship with respect to voltages developed across the windings by current flow in said primary winding, means for proportioning the reluctance of each of said magnetic circuits such that in the absence of current flow in said secondary windings the net voltage across said secondary windings is zero and that for a predetermined current flow through each of said secondary windings a predetermined voltage across said primary winding provides a voltage across each of said secondary windings of the same amplitude.

5. A transformer comprising a primary winding, a pair of secondary windings, each of said secondary windings lying within and coupled to said primary winding through a respective magnetic circuit, each magnetic circuit including a core of magnetic material the permeability of which decreases with increasing flux density in the core over a range of flux densities whereby the reluctance of each of said circuits varies in a direct relationship with respect to the net flux density therein, a permanent magnet lying within said primary winding for providing magnetic induction to said cores to produce flux density therein lying in said range, means for connecting said secondary windings in series opposing relationship with respect to the voltage induced therein by current flow in said primary winding, means for adjusting the reluctance of each of said circuits such that in the absence of current flow in said secondary windings the net voltage across said secondary windings is zero.

6. A transformer comprising a primary winding, a pair of secondary windings, each of said secondary windings lying within and coupled to said primary winding through a respective magnetic circuit, each magnetic circuit including a core of magnetic material the permeability of which decreases with increasing flux density in the core over a range of flux densities whereby the reluctance of each of said circuits varies in a direct relationship with respect to the net flux density therein, the diameter of the turns of each of said secondary windings being substantially smaller than the diameter of the turns of said primary winding, the axial length of said secondary windings being substantially greater than the diameter thereof, means for providing magnetic induction to said cores to provide flux density therein lying in said range, means for connecting said secondary windings in series opposing relationship with respect to the voltage induced therein by current flow in said primary winding, means for adjusting the reluctance of each of said circuits such that in the absence of current flow in said secondary windings the net voltage across said secondary windings is zero.

7. A transformer comprising a primary winding, a pair of secondary windings, each of said secondary windings lying within and coupled to said primary winding through a respective magnetic circuit, each magnetic circuit including a core of magnetic material the permeability of which decreases with increasing flux density in the core over a range of flux densities whereby the reluctance of each of said circuits varies in a direct relationship with respect to the net flux density therein, the axes of the coils of each of said windings being essentially parallel, the diameter of the turns of each of said secondary windings being substantially smaller than the diameter of the turns of said primary winding, the axial length of said secondary windings being substantially greater than the diameters thereof, each of said cores being in the form cylinder adjustably positioned within a respective secondary winding, means for providing magnetic induction to said cores to provide flux density therein lying in said range, means for connecting said secondary windings in series opposing relationship with respect to the voltage induced therein by current flow in said primary winding, means for adjusting the reluctance of each of said circuits such that in the absence of current flow in said secondary windings the net voltage across said secondary windings is zero.

8. A deflection system for a cathode ray tube comprising a pair of vertical deflection coils, means for connecting said coils in circuit with a source of vertical deflection current, said vertical deflection current consisting of a plurality of waves, each wave having a portion which gradually decreases from one peak value in one direction to zero and increases in the opposite direction to another peak value and another portion which quickly decreases in said opposite direction from said other peak value to zero and quickly increases in said one direction to said one peak value, a capacitance and inductance each connected in series with said deflection coils and in parallel with one another, said inductance and capacitance tuned to the horizontal deflection frequency of the system, a transformer including a primary and a pair of secondary windings, each of said secondary windings coupled to said primary windings through a respective magnetic circuit, each magnetic circuit including a core of magnetic material, the permeability of which decreases with increasing flux density in the core over a range of flux densities whereby the reluctance of each of said circuits varies in a direct relationship with respect to the net flux density therein, means for providing magnetic induction to said cores to provide flux density lying in said range, means for connecting said secondary windings in series opposing relationship with respect to voltage induced therein by current flow in said primary winding and in series circuit with said capacitance and inductances and in series circuit with said deflection coils whereby vertical deflection current flows through said resonant circuit and said secondary windings, means for adjusting the reluctance of said magnetic circuits such that the voltage developed across said windings is the same for a predetermined value of vertical deflection current flow therethrough, means for applying horizontal deflection currents to the primary winding of said transformer.

9. A deflection system for a cathode ray tube comprising a pair of vertical deflection coils, means for connecting said coils in circuit with a source of vertical deflection current, said vertical deflection current consisting of a plurality of waves, each wave having a portion which gradually decreases from one peak value in one direction to zero and increases in the opposite direction to another peak value and another portion which quickly decreases in said opposite direction from said other peak value to zero and quickly increases in said one direction to said one peak value, a capacitance and inductance each connected in series with said deflection coils and in parallel with one another, said inductance and capacitance tuned to the horizontal deflection frequency of the system, a transformer including a primary and a pair of secondary windings, each of said secondary windings coupled to said primary windings through a respective magnetic circuit, each magnetic circuit including a core of magnetic material, the permeability of which decreases with increasing flux density in the core over a range of flux densities whereby the reluctance of each of said circuit varies in a direct relationship with respect to the net flux density therein, means for providing magnetic induction to said cores to provide flux density lying in said range, means for connecting said secondary windings in series opposing relationship with respect to voltage induced therein by current flow in said primary winding and in series circuit with said capacitance and inductances and in series circuit with said deflection coils whereby vertical deflection current flows through said resonant circuit and said secondary windings, means for adjusting the reluctance of each of said circuits such that in the absence of current flow in said secondary windings the net voltage across said secondary windings is zero, whereby a predetermined current flow in one direction through said windings produces a net voltage of one phase and a flow of a predetermined current through said windings in the opposite direction produces a net voltage of the opposite phase, said predetermined currents in said one and said opposite directions of the same amplitude producing net voltages of the same amplitude, means for applying horizontal deflection currents to said primary winding of said transformer, whereby the current flow superimposed on the vertical deflection current which has a horizontal deflection frequency rate and which is of maximum amplitude at said one peak of vertical deflection current and which decreases gradually with the decrease of vertical deflection current to a zero value and increases from said zero value as the vertical deflection current increases from zero value to said other peak value.

10. A deflection system for a cathode ray tube comprising a pair of vertical deflection coils, means for connecting said coils in circuit with a source of vertical deflection current, said deflection current consisting of a plurality of waves, each wave having a portion which gradually decreases from one peak value in one direction to zero and increases in the opposite direction to another peak value and another portion which quickly decreases in said opposite direction from said other peak value to zero and quickly increases in said one direction to said one peak value, a capacitance and inductance each connected in series with said deflection coils and in parallel with one another, said inductance and capacitance tuned to the horizontal deflection frequency of the system, a transformer including a primary and a pair of secondary windings, each of said secondary windings coupled to said primary windings through a respective magnetic circuit, each magnetic circuit including a core of magnetic material, the permeability of which decreases with increasing flux density in the core over a range of flux densities whereby the reluctance of each of said circuits varies in a direct relationship with respect to the net flux density therein, means for providing magnetic induction to said cores to provide flux density lying in said range, means for connecting one of said secondary windings in series between one of said coils and said inductance and between said inductance and said capacitance, and means for connecting the other of said windings in series between the other of said coils and said inductance, and between said inductance and capacitance, opposing relationship with respect to voltage induced therein by current flow in said primary winding and in series circuit with said capacitance and inductances whereby vertical deflection current flows through said inductance and said secondary windings, means for adjusting the reluctance of said magnetic circuits such that the voltage developed across said windings is the same for a predetermined value of vertical deflection current flow therethrough, means for applying horizontal deflection current to the primary winding of said transformer.

11. A deflection system for a cathode ray tube comprising a pair of vertical deflection coils, means for connecting said coils in circuit with a source of vertical deflection current, said deflection current consisting of a plurality of waves, each wave having a portion which gradually decreases from one peak value in one direction to zero and increases in the opposite direction to another peak value and another portion which quickly decreases in said opposite direction from said other peak value to zero and quickly increases in said one direction to said one peak value, a capacitance and inductance each connected in series with said deflection coils and in parallel with one another, said inductance and capacitance tuned to the horizontal deflection frequency of the system, a transformer including a primary and a pair of secondary windings, each of said secondary windings coupled to said primary windings through a respective magnetic circuit, each magnetic circuit including a core of magnetic material, the permeability of which decreases with increasing flux density in the core over a range of flux densities whereby the reluctance of each of said circuits varies in a direct relationship with respect to the net flux density therein, means for providing magnetic induction to said cores to provide flux density lying in said range, means for connecting one of said secondary windings in series between one of said coils and said inductance and between said inductance and said capacitance, and means for connecting the other of said windings in series between the other of said coils and said inductance, and between said inductance and capacitance, opposing relationship with respect to voltage induced therein by current flow in said primary winding and in series circuit with said capacitance and inductances whereby vertical deflection current flows through said inductance and said secondary windings, means for adjusting the reluctance of said magnetic circuits such that the voltage developed across said windings is the same for a predetermined value of vertical deflection current flow therethrough, means for applying horizontal deflection currents to the primary winding of said transformer, a pair of resistances connected in series across said resonant circuit, means for connecting an intermediate point on said inductance to the junction of said resistances.

12. A deflection system for a cathode ray tube comprising a pair of vertical deflection coils, means for connecting said coils in circuit with a source of vertical deflection current, said deflection current consisting of a plurality of waves, each wave having a portion which gradually decreases from one peak value in one direction to zero and increases in the opposite direction to another peak value and another portion which quickly decreases in said opposite direction from said other peak value to zero and quickly increases in said one direction to said one peak value, a capacitance and inductance each connected in series with said deflection coils and in parallel with one another, said inductance and capacitance tuned to the horizontal deflection frequency of the system, a transformer including a primary and a pair of secondary windings, each of said secondary windings coupled to said primary windings through a respective magnetic circuit, each magnetic circuit including a core of magnetic material, the permeability of which decreases with increasing flux density in the core over a range of flux densities whereby the reluctance of each of said circuits varies in a direct relationship with respect to the net flux density therein, means for providing magnetic induction to said cores to provide flux density lying in said range, means for connecting one of said secondary windings in series between one of said coils and said inductance and between said inductance and said capacitance, and means for connecting the other of said windings in series between the other of said coils and said inductance, and between said inductance and capacitance, opposing relationship with respect to voltage induced therein by current flow in said primary winding and in series circuit with said capacitance and inductances whereby vertical deflection current flows through said inductance and said secondary windings, means for adjusting the reluctance of said magnetic circuits such that the voltage developed across said windings is the same for a predetermined value of vertical deflection current flow therethrough, means for applying horizontal deflection currents to the primary winding of said transformer, a pair of resistances connected in series across said resonant circuit, means for connecting an intermediate point on said inductance to the junction of said resistances, means in shunt with said resonant circuit for controlling the amplitude of resonant currents developed by said resonant circuit.

References Cited

UNITED STATES PATENTS

| | | | |
|---|---|---|---|
| 3,287,680 | 11/1966 | Houpt et al. | 336—181 X |
| 3,329,859 | 7/1967 | Lemke | 315—24 |
| 3,346,765 | 10/1967 | Barkow | 315—27 |
| 2,477,475 | 7/1949 | Braden | 336—132 X |

RODNEY D. BENNETT, Jr., *Primary Examiner.*

RICHARD E. BERGER, *Assistant Examiner.*

U.S. Cl. X.R.

315—27; 336—132, 181